US007426049B2

(12) United States Patent
Peter et al.

(10) Patent No.: US 7,426,049 B2
(45) Date of Patent: Sep. 16, 2008

(54) PRINTING RETAINED PRINT JOBS

(75) Inventors: Gary M. Peter, Boise, ID (US); Matt Howell, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 848 days.

(21) Appl. No.: 09/906,890

(22) Filed: Jul. 16, 2001

(65) Prior Publication Data

US 2003/0011803 A1   Jan. 16, 2003

(51) Int. Cl.
  *G06F 3/12* (2006.01)
  *G06F 15/00* (2006.01)
  *G06K 1/00* (2006.01)

(52) U.S. Cl. .................... 358/1.15; 358/1.13; 358/1.14; 358/1.15; 358/1.16; 709/247

(58) Field of Classification Search ................ 358/1.13, 358/1.14, 1.15, 1.16; 709/247
See application file for complete search history.

(56) References Cited

U.S. PATENT DOCUMENTS

| 5,720,015 | A | * | 2/1998 | Martin et al. | 358/1.15 |
| 5,764,863 | A |   | 6/1998 | Fall et al. | 395/112 |
| 5,802,260 | A | * | 9/1998 | Shimakawa et al. | 358/1.15 |
| 6,094,276 | A | * | 7/2000 | Yamaguchi et al. | 358/1.15 |
| 6,160,629 | A |   | 12/2000 | Tang et al. | 358/1.1 |
| 6,577,407 | B1 | * | 6/2003 | Kopecki | 358/1.15 |

* cited by examiner

*Primary Examiner*—David K Moore
*Assistant Examiner*—Yixing Qin
(74) *Attorney, Agent, or Firm*—Matthew L. Wade

(57) ABSTRACT

A computing system including a printer capable of retaining print jobs, a first computer and a second computer. The first computer is capable of transmitting a print job to the printer that causes the printer to retain the job. The first computer is also operable to cause the second computer to store a record of the job. A user of the first computer can later retrieve this record in order to identify the job. The user can also interact with the first computer to re-print the job.

16 Claims, 5 Drawing Sheets

PRINTING RETAINED PRINT JOBS

BACKGROUND OF THE INVENTION

Today, many printing devices includes "Job retention printing capability". A detailed explanation of job retention printing is described by the patent entitled "Multiple copy printer with print job retention", U.S. Pat. No. 6,160,629. That patent is incorporated herein by reference.

Job retention, generally, refers to a printer's ability to store a received print job locally in the printer's local storage device (e.g., the printer's local disk drive). The print job is printed when certain conditions are met. There are a several types of retention printing.

A first type of retention printing is commonly referred to as "quick copy printing". According to quick copy printing, a printer stores a received multi-copy print job and prints the copies. Thereafter, a walk-up user can cause additional copies to be printed by interacting with the printer's control panel.

A second type of retention printing is commonly referred to as "Proof and Hold" printing. According to "Proof and Hold" printing, a printer stores a received multi-copy print job and prints a limited number of copies (typically one copy). Thereafter, a walk-up user can cause the rest of the copies to be printed by "releasing them" from the printer's control panel.

A third type of retention printing is commonly referred to as "private" printing. According to private printing, a printer stores a received print job and delays printing until a privacy code is entered by a walk-up user at the printer's control panel.

A fourth type of retention printing is commonly referred to as "simple retention" printing. According to simple retention printing, a received print job is simply stored and not printed. Future printing of the job is then available to walk up users via the printer's control panel.

For purposes of this application, a print job that causes a printer to perform any one of the four types of retention printing described above may generally be referred to herein as a "retention job". Thus, for example, a print job that invokes "quick copy" printing is a "retention job". Additionally, a printer that supports retention printing may be referred to herein as a "retention printer".

Many personal computers include software (e.g., a word processing application and print driver) that allow a user to generate and print a document using retention printing. Typically, to print the document, the user provides certain input to the personal computer. The input specifies the printer that is to be used for printing, the number of copies that are to be printed, and the type of retention printing. In response to this user input, the personal computer generates a retention job that describes the document and transmits the job to the selected printer.

The user, after the retention job has been transmitted to the selected printer, may then wish to print the same version of a document using a second printer. This can present a significant problem to the user. One way a user can solve this problem is for him/her to make use of the personal computer to recreate the retention job and have it sent to second printer. Unfortunately, this solution can often be inconvenient to the user and can cost the user valuable time. Additionally, because two different source files are used to print each copy of the document, the user may not be assured that the same version of the document is printed. What is needed is an easier way for a user to perform this task.

SUMMARY OF THE INVENTION

The present invention may be implemented, for example, as a method of printing. The method may include transmitting a retention job to a first printer and transmitting a command to the remote computer. The first printer is responsive to the print job, at least in part, by retaining the print job. The remote computer is responsive to the command by generating a record. The record includes an identifier of the print job and an identifier of the printer.

The present invention may also be implemented, for example, as a computer readable medium embodying a program of instructions executable by the computer to perform method steps for causing a second printer to receive a document presently being retained by a first printer. The method steps may include causing the document to be transferred from the first printer to the second printer in response to user input.

The present invention may also be implemented, for example, as a computer. The computer may include apparatus for transmitting a retention job to a first printer. The first printer being responsive to the retention job, at least in part, by retaining the retention job. In addition, the computer includes an apparatus for transmitting a command to a second computer, the second computer being responsive to the command by storing an identifier of the retention job and an identifier of the printer.

The present invention may also be implemented, for example, as a computing system. The computing system may include a printer capable of retaining retention jobs, a first computer; and a second computer. The second computer is operable to transmit a retention job to the printer and to transmit a command to the first printer. The first computer is responsive to the command, at least in part, by recording an identifier of the retention job and an identifier of the printer.

Other aspects and advantages of the present invention will become apparent from the following detailed description, taken in conjunction with the accompanying drawings, illustrating by way of example, the principles of the invention.

DETAILED DESCRIPTION OF THE INVENTION

Figure 1:
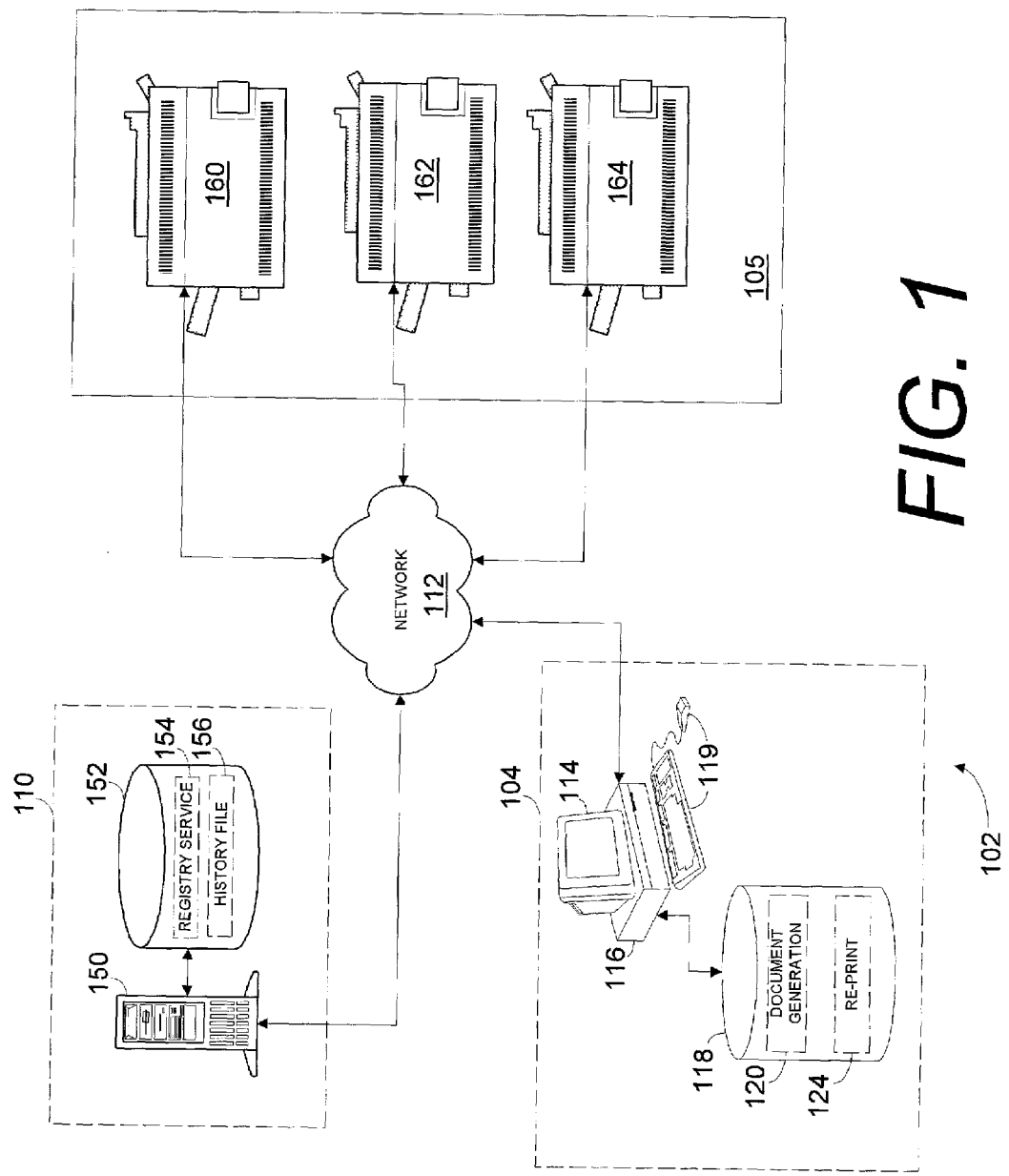
FIG. 1 is a block diagram of a computing system for illustrating, for example, an embodiment of the invention.

As shown in FIG. 1, for purposes of illustration, the invention is embodied in a novel computing system 102. The computing system 102 includes a personal computer 104, a group of printers 105 and a "registry computer" 110 all connected by a network 112. The network 112 may represent an Intranet or the INTERNET or some combination thereof.

The personal computer 104 includes a display monitor 114, a processing unit 116, a memory 118 and user input devices 119. Stored in the memory 118 is document generation software 120 and a reprint software program 124. The processing unit 116 can retrieve and execute these software programs in an appropriate manner. A user of the computer 104 can provide input to each of these programs via the user input devices 119. The document generation software 120 may represent, for example, a word processing application and/or one or more print drivers.

The registry computer 110 includes a processing unit 150 and a memory 152. Stored in the memory 152 is a registry service program 154 and a job history file 156. As explained in greater detail below, the history file 156 is used to store a record of each retention job that is transmitted by the computer 104 over a certain period of time. The registry service program 154 is used to maintain the history file 156 and to respond to certain commands received over the network 112.

In this embodiment, the group of printers 105 includes three printers: a first printer 160, a second printer 162 and a third printer 164. Each one of these printers support retention printing and can locally store retention jobs.

As noted above, the personal computer's document generation software 120 may represent, for example, a word processing application and one or more associated print drivers. In general, this software allows a user of the personal computer 104 to create a document and to print the document using any one of the three printers. Importantly, the user can request that the document be printed using any one of the four types of retention printing described above.

In response to a user request to print a document using retention printing, the personal computer 104, under the direction of the software 120, generates a retention job and transmits the retention job to the user selected printer. In this embodiment, each time a retention job is transmitted to one of the three printers, a command is transmitted to the registry computer 110. For ease of discussion, this command is referred to herein as the "registry update command".

In this embodiment, the registry update command includes the following information: an identifier of the retention job (job ID) that was just transmitted, an identifier of the printer (printer identifier) that received the job and an identifier of the user (user ID). The registry update command directs the registry computer 110 to place a record of this information in the history file 156.

The printer ID is a unique ID (e.g, the printer's network address) previously assigned to the printer that allows the printer to be identified. The job ID may be the job name and is used to identify the job. The user ID is a unique ID assigned to the user (e.g., an account number assigned to the user).

Figure 2:
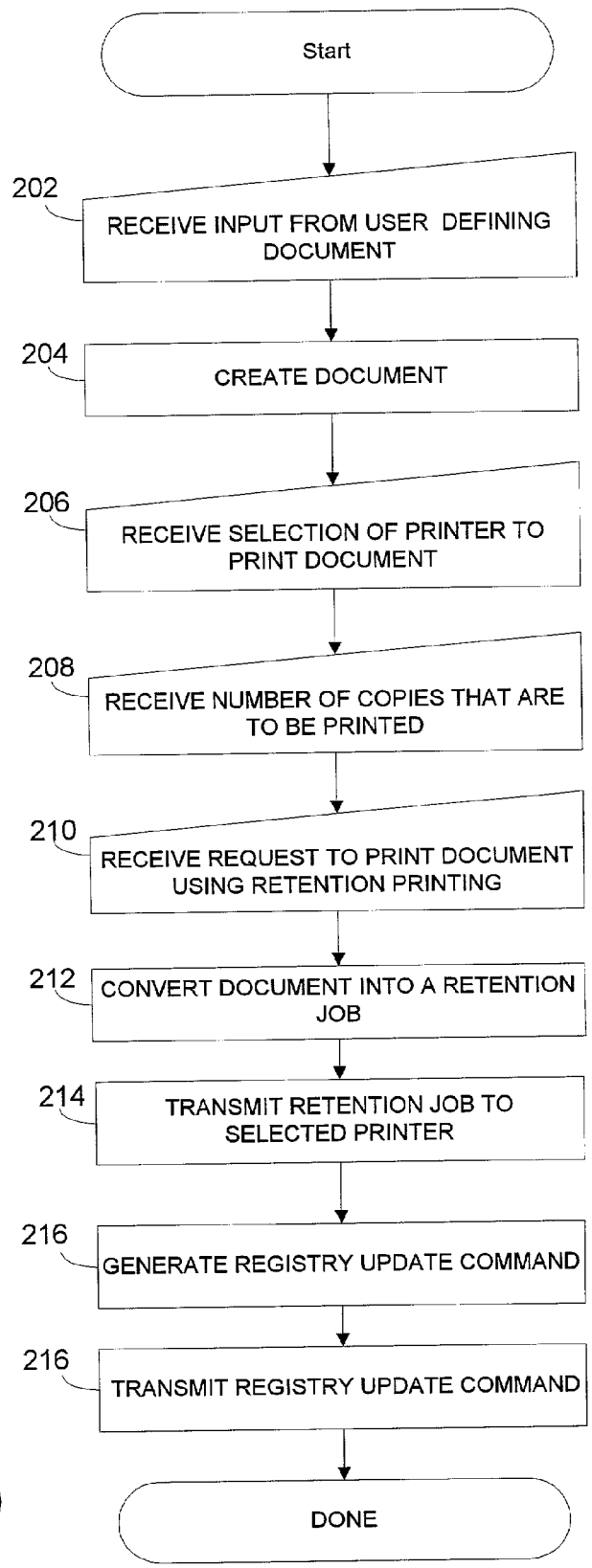
FIG. 2 is a flow diagram illustrating the operation of a print driver to generate a retention job and to transmit the retention job to a printer.

FIG. 2 is a flow diagram illustrating the operation of the personal computer 104, under the direction of the software 120, to generate and transmit a retention job to one of the three printers. Turning now to FIG. 2, the computer 104 receives input from the present user (step 202). The input defines a document. In response to this input, the computer 104 creates a document (step 204). Next, the computer 104 receives further input from the user requesting the document be printed (step 206). The input specifies the printer that is to be used to print the document, the number of copies that are to be printed, and the type of retention printing that is to be used to print the document. For example, the user may request that the document be printed using "quick-copy printing".

In response to the user input received at step 206, the computer 104 converts the document into a retention job (step 208). Next, the computer 104 transmits the job to the specified printer (step 210) Additionally, the computer 104 generates a registry update command (step 212). The registry command is then transmitted to the registry computer 110 (214). The registry update command includes the name of the retention job generated at step 212, the name of the printer that received the job and an identifier assigned to the present user. The identifier may be for, example, the present user's account number.

Figure 3:
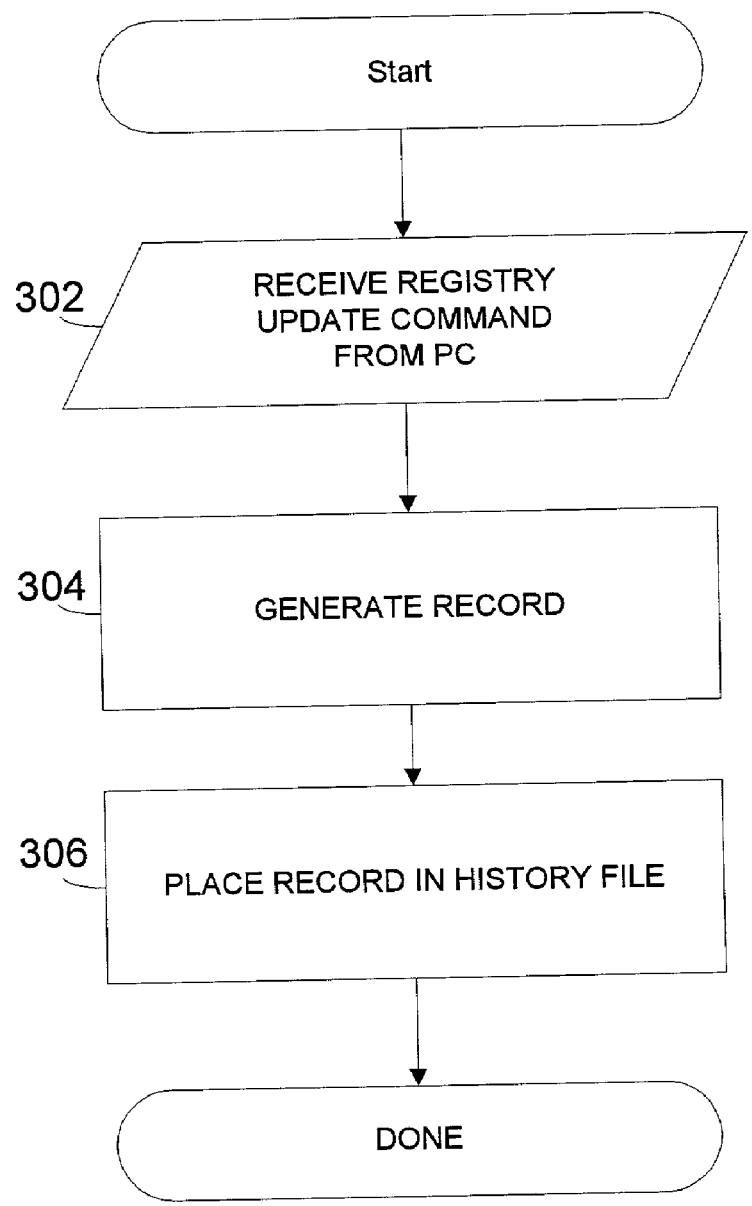
FIG. 3 is a flow diagram illustrating the operation of a registry computer in computing system.

FIG. 3 is a flow diagram illustrating the operation of the registry computer 110, under the direction of the registry service program 154, in response to receiving a registry update command.

Turning now to FIG. 3, the registry computer 110 receives a registry update command from the computer 104 at step 302. In response, the registry computer 110 generates a record (step 304). The record includes the name of the retention job, the name of the printer that received the job and the user identifier. At step 304, the registry computer 110 places the record in the history file 156.

It can be seen from the foregoing that the registry computer 110 stores a record of each retention job that was transmitted by a user of the computer 104. In this manner, the registry computer 110 keeps track of the user's retention jobs. In this embodiment, the registry computer 110 further operates, under the direction of the registry service program 154, to remove records that were originally created past a defined time period. We will refer to this period of time as the "job history period". In this embodiment, for example, the registry computer 110 removes any record that was created more than 48 hours ago. The job history period, in this example, is therefore 48 hours.

Figure 4:
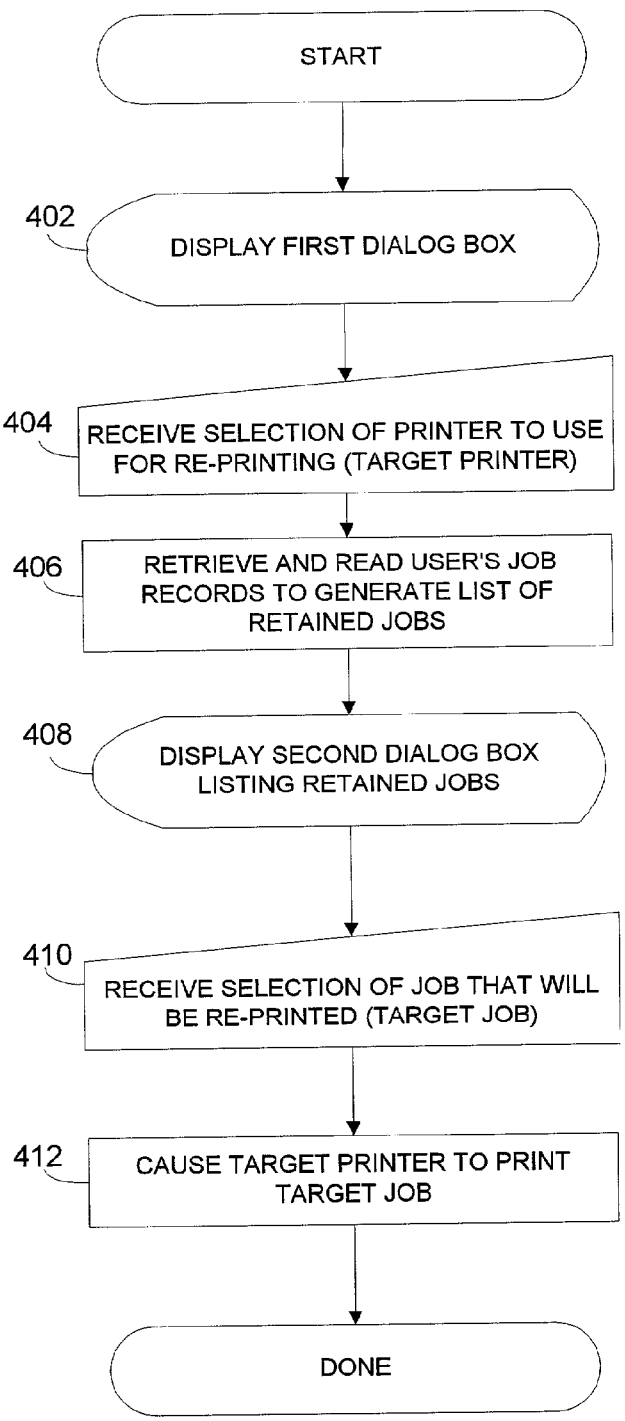
FIG. 4 is a flow diagram illustrating the operation of the computer to request a re-print of a retention job.

In general, the re-print program 124 allows the user to make use of the personal computer 104 to re-print a previously transmitted retention job. FIG. 4 is a flow diagram illustrating the operation of the computer 104, under the direction of the re-print program 124, to allow a user to re-print a previously transmitted retention job.

Turning now to FIG. 4, the personal computer 104 displays a dialog box at step 402. By interacting with this first dialog box, the user can select a printer from the group of printers 105 that will be used to re-print a previously transmitted retention job. The computer 104 receives this input at step 404.

At step 406, the computer 104 retrieves the user's job records from the registry computer 110 (step 406). The user's records being those records presently stored in the history file 156 that include the user's identifier.

The computer 104 reads these records to generate a list of the user's retention jobs that were transmitted over the history period. The computer 104 displays a second dialog box that includes the list at step 408.

By interacting with this second dialog box, the user can select a job from the list for re-printing. The computer 104 receives a selection from the user at step 410.

For ease of discussion, the printer selected by the user at step 406 will be referred to herein as the "new target printer". The job selected to be reprinted at step 410 will be referred to herein as the "target job". The printer that originally received the target job when it was first transmitted by the computer 104 will be referred to as the "original target printer". It is important to note that the original target printer and the new target printer may not be the same printer.

At step 412, the computer 104 causes the new target printer to print the target job. In this embodiment, the computer 104 performs step 412 by transmitting a command to the new target printer. This command will be referred to herein as the "re-print request". The re-print request includes the name of the target job and directs the printer to print the target job.

The new target printer, under the direction of its control firmware, responds to the request by retrieving the target job and then re-printing it. In this embodiment, if the new target printer is storing the target job locally, the printer retrieves a copy of the job and re-submits it for printing.

Figure 5:
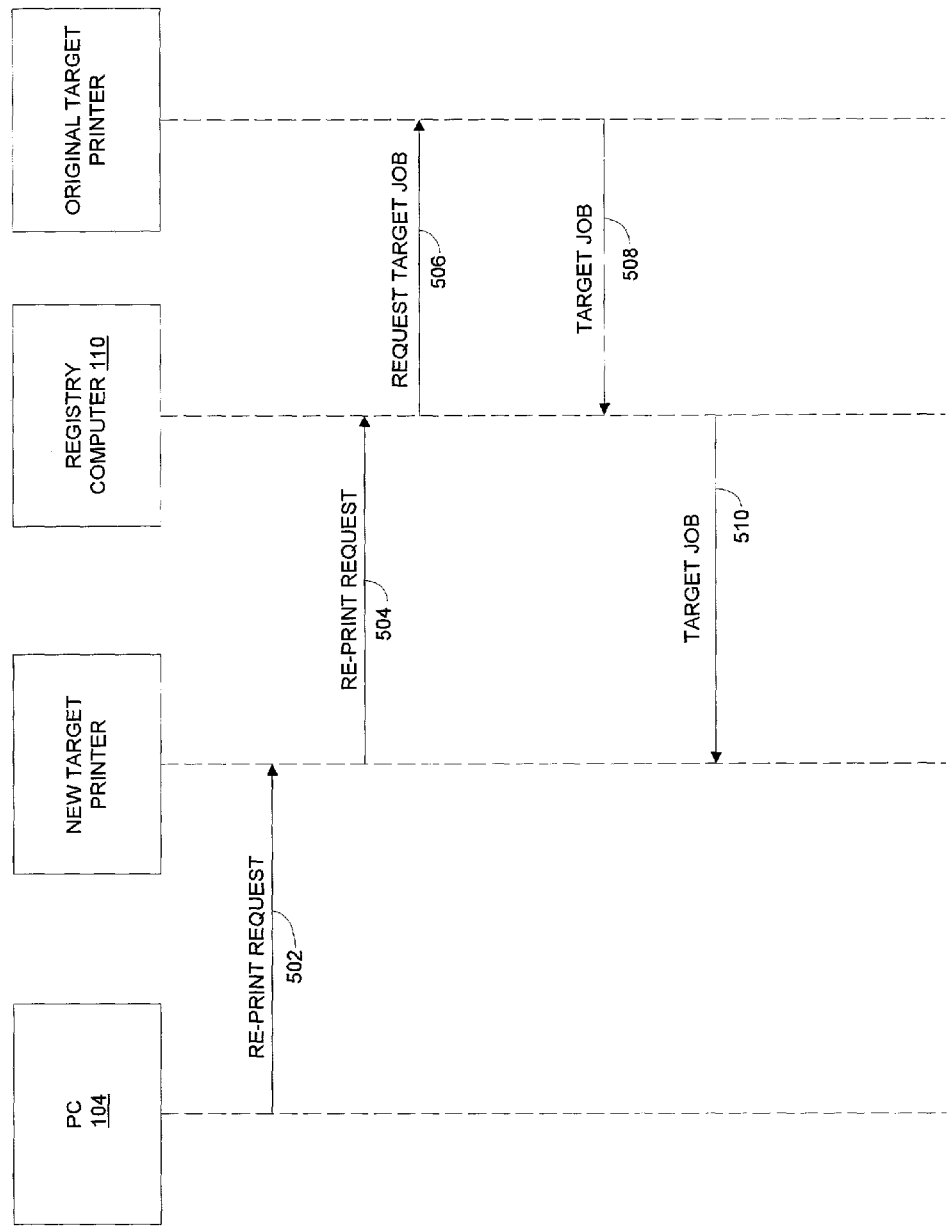
FIG. 5 is a sequence diagram illustrating certain transactions that can occur in the system.

If, however, the target job is not stored locally, the new target printer operates to use the registry computer 110 to retrieve the target job. FIG. 5 is a sequence diagram that illustrates this operation further. It is noted that, in FIG. 5, the box labeled "new target printer" and the box labeled "original target printer" may represent any two different printers in the group of printers 105.

Turning now to FIG. 5, the personal computer 104 transmits a reprint request to the new target printer (transaction 502). In response to receiving the request, the new target printer determines that the target job is not locally stored. As a result, the new target printer passes the request to the registry computer 110 (transaction 504). The registry computer 110, under the direction of the registry service 154, responds to the request by identifying the original target printer which is presently storing the target job. This information may be obtained from the job's record in the history file 156. Once the original target printer is identified, the registry computer 110 operates to transmit a request for the target job to the original target printer (transaction 506). The original target printer responds to the request by retrieving the target job and then transmitting it to the target printer (transaction 508). Upon receiving the target job, the registry computer 110 operates to pass it on to the new target printer (transaction 510). The new target printer receives the target job and prints it in accordance with the retention printing type the job.

Thus, for example, if the target job is a multi-copy "quick copy" print job, the new target printer responds by storing the target job and printing the copies. Thereafter, a walk-up user can cause additional copies to be printed by interacting with the printer's control panel.

In the embodiments just described, the functionality provided by any one of the programs described above may alternatively be provided in whole or in part by hardware components. For example, one or more of the steps illustrated in any of the flow diagrams could be performed by operation of an application specific integrated circuit having appropriate logic gates, a programmable gate array (s) (PGA) or a field programmable gate array (FPGA). Additionally, it should be understood that any of the steps depicted in these flow diagrams may be performed in a different sequence shown. In fact, some steps may be performed concurrently or with partial concurrence, in reverse order, etc.

It is important to note that in other embodiments of the invention, the computer that originally sent the target job and the computer that initiates the re-printing of the target job to be re-printed are two different computers. For example, it can be seen that the pre-print function of the personal computer 104 could also be performed by a personal digital assistant (PDA) or a laptop computer. This would allow a user to re-print a retention job without having to access the same computer that originally sent the job. This can be particularly advantageous when the group of printers that make use of the registry service are geographically far apart.

It is also noted that in other embodiments, the computer (e.g., the personal computer 104) that initiates the transfer of the target job from the original target printer to the new target printer may do so in a different manner than described above. For example, the computer may interact directly with the registry computer to cause the registry computer to perform the transfer.

Alternatively, the computer may interact directly with the original target printer. All these variations are within the scope of the invention. Furthermore, the invention may be implemented as a WEB based system.

It is also noted that in other embodiments, the user is provided the option of changing the way the target job will be printed by the new target printer. For example, the user may be given the option to change the type of retention printing that will be used to print the target job, adjust the number of copies that will be printed, etc.

It is also noted that in other embodiments the registry update command is transmitted only at the request of the user. For example, during the creation of a particular retention job, the user may be given the option to store a record of the job. The registry update command is transmitted to the registry computer 110 only if this option is selected.

In addition, the user may also be given the option to make a particular retention job a "public document". In this case, the registry update command generated causes the registry computers to generate a "public record" of the job. The record includes the ID of the retention job, an identifier of the printer and a public ID. Any user in the system can obtain the record of the job and can re-print the job. In this manner, the system is used to publically distribute pre-defined documents to multiple users.

Furthermore, the present invention may be embodied in the form of a "computer readable medium" that has any one of the programs described above embodied therein. For example, the memory 118 and the memory 152 may each be considered embodiments of the invention. Importantly, the phrase "computer readable medium" can refer to any medium that can contain, store or propagate computer readable code. Thus, in this context, computer readable medium may refer to a tangible medium such as a CD ROM or an intangible medium, such as signals that are used to communicate the computer readable code over a network or the INTERNET. A computer readable medium may also be a carrier wave.

From the forgoing it will be appreciated that the invention provides a novel and advantageous way for a user to re-print a previously transmitted retention job. Although several specific embodiments of the invention has been described and illustrated, the invention is not to be limited to specific forms or arrangements of parts so described and illustrated. The invention is limited only by the claims and the equivalents thereof.

What is claimed is:

1. A computer system method, comprising:
   transmitting a retention print job to a first printer, the first printer being responsive to the retention print job, at least in part, by storing the print job;
   transmitting at least one command to a registry computer, the registry computer being responsive to the at least one command by generating a record of the print job;
   transmitting a request to a second printer to print the print job;
   wherein the second printer is responsive to the request, at least in part, by transmitting a request to the registry computer in order to cause the registry computer to transfer the print job from the first printer to the second printer.

2. In a network including first printer and a second printer operatively connected to a registry computer that is distinct from the first printer and the second printer, a method comprising:
   transmitting a retention print job to the first printer, the first printer being responsive to the retention print job, at least in part, by storing the print job;
   receiving a first request to print the print job that is presently being stored by the first printer;
   transmitting a second request to the registry computer, the registry computer being responsive to the second request by causing the print job to be transferred from the first printer to the second printer; and the second printer receiving the print job.

3. The method of claim 2, further comprising:

the second printer printing the received print job.

4. The method of claim 2, further comprising:

the second printer storing the received print job.

5. The method of claim 3, wherein the second printer receiving the print job comprises the second printer receiving the print job from the registry computer.

6. A computer system method, comprising:

transmitting a retention print job to a first printer, the first printer being responsive to the retention print job, at least in part, by storing the print job;

receiving a first request to print the print job that is presently being stored by the first printer;

transmitting a second request to a registry computer, the registry computer being distinct from the firs printer and the second printer;

wherein the registry computer being responsive to the second request by causing the print job to be transferred from the first printer to a second printer.

7. The method of claim 6, further comprising:

the second printer receiving the print job; and the second printer printing the print job.

8. The method of claim of claim 6, wherein the second printer receives the print job;

wherein the second printer prints the print job.

9. The method of claim 6, wherein the second printer receives the print job from the registry computer.

10. The method of claim 1, wherein the step of transmitting the retention job to the first printer is performed by a first computer;

wherein the step of transmitting the request to the second printer is performed by a second computer;

wherein the first and second computers are two different computers.

11. The method of claim 1, wherein the step of transmitting the retention job to the first printer and the step of transmitting the request to the second printer are each performed by a same computer.

12. A method performed by a registry computer connected over a network to both a first printer and a second printer, where the first printer stores a retention print job, the method comprising:

the registry computer receiving a request to print the retention print job stored by the first printer; and in response to the request, the registry computer causing the retention print job to be transferred from the first printer to the second printer wherein the registry computer receives the request to print the retention print job from the second printer.

13. The method of claim 12, wherein the second printer is responsive to receiving the retention print job by printing the print job.

14. The method of claim 12, wherein the second printer is responsive to receiving the retention print job by storing the print job.

15. The method of claim 12, wherein the registry computer is connected to the first and second printer over a network.

16. A method performed by a registry computer connected over a network to both a first printer and a second printer, where the first printer stores a retention print job, the method comprising:

the registry computer receiving a request to print the retention print job stored by the first printer;

in response to the request, the registry computer causing the retention print job to be transferred from the first printer to the second printer;

prior to receiving the request from the second printer, the registry computer receiving at least one command from a computer that originally transmitted the retention print job to the first printer;

in response to the at least one command, the registry computer generating a record of the retention print job.

* * * * *

UNITED STATES PATENT AND TRADEMARK OFFICE
CERTIFICATE OF CORRECTION

PATENT NO. : 7,426,049 B2 Page 1 of 1
APPLICATION NO. : 09/906890
DATED : September 16, 2008
INVENTOR(S) : Gary M. Peter et al.

It is certified that error appears in the above-identified patent and that said Letters Patent is hereby corrected as shown below:

In column 6, line 57, in Claim 2, after "including" insert -- a --.

In column 7, line 19, in Claim 6, delete "firs" and insert -- first --, therefor.

In column 7, line 27, in Claim 8, after "method of claim" delete "of claim".

Signed and Sealed this

Eighteenth Day of August, 2009

David J. Kappos
*Director of the United States Patent and Trademark Office*